J. R. FORMBY.
NUT LOCK.
APPLICATION FILED APR. 28, 1914.
1,140,974.
Patented May 25, 1915.
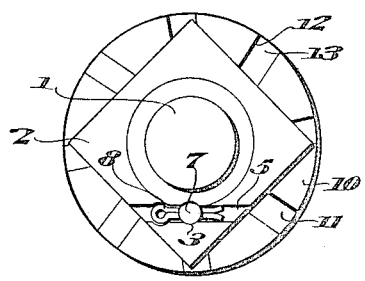
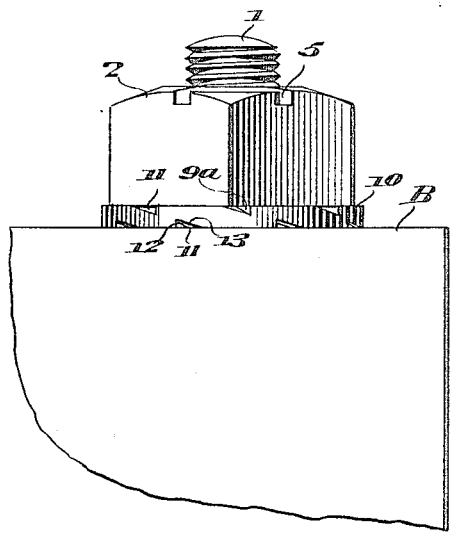
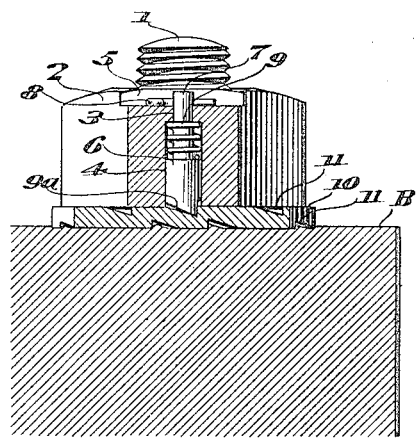
Witnesses
Inventor
John R. Formby
By Victor J. Evans
Attorney

UNITED STATES PATENT OFFICE.

JOHN R. FORMBY, OF LOGTOWN, MISSISSIPPI.

NUT-LOCK.

1,140,974.  Specification of Letters Patent.  Patented May 25, 1915.

Application filed April 28, 1914.   Serial No. 835,006.

*To all whom it may concern:*

Be it known that I, JOHN R. FORMBY, a citizen of the United States, residing at Logtown, in the county of Hancock and State of Mississippi, have invented new and useful Improvements in Nut-Locks, of which the following is a specification.

This invention relates to improvements in nut locks and especially with reference to the provision of a spring projecting locking stud carried by a nut and a washer for arrangement under the nut and having radial grooves on opposite sides so that one of the grooves on the side of the washer next the nut may be engaged by the locking stud and the other grooves engaged with the beam or piece of timber on which the nut and its bolt are used and hence prevented from turning, the invention consisting in the construction, combination and arrangement of devices hereinafter described and claimed.

In the accompanying drawings:—Figure 1 is a plan of a bolt and nut provided with nut locking devices in accordance with my invention. Fig. 2 is a side elevation of the same in use. Fig. 3 is a sectional view of the same on a plane coincident with the locking stud.

For the purposes of this specification a bolt is indicated at 1. The nut 2 is provided with a bore 3 which extends from its outer face to its inner face and is arranged near its corner, the inner portion of the bore being enlarged as at 4. In the outer side of the nut is a diagonal groove 5 which is coincident with the outer end of the bore. A locking stud 6 is arranged in the enlarged portion of the bore and has a stem 7 which passes through the smaller portion of the bore, the outer end of said stem being arranged in the groove 5 and having a transverse opening which is engaged by a split key 8 which is arranged in said groove. A spring 9 is arranged in the enlarged portion of the bore and bears on the stud 6 to project the latter normally beyond the inner face of the nut. This inner end of the stud is beveled to form an engaging edge 9ª. A washer 10 is arranged on the bolt to bear on the beam, timber or other wood B in which the bolt is used. This washer is provided in each side with radial grooves 11 each of which has a nearly vertical wall 12 and an inclined wall or bottom 13, the grooves being obtuse angled in cross section. The grooves on opposite sides of the washer are arranged in reverse order. The washer bears between the work and the nut and when the latter is screwed up on the bolt the stud 6 engages one of the outer grooves, thereby locking the nut in place. The pressure of the washer on the work causes the washer to be partly embedded in the substance of the work so that its inner grooves are engaged by the work and thereby the washer is held against being turned and the nut is securely fastened in place. To release the nut the stud 6 should be first drawn out of engagement with the groove washer, against the tension of its spring and the nut may then be readily turned.

Having thus described my invention, I claim:—

A nut having a bore extending therethrough from its inner face to its outer face, the inner portion of said bore being enlarged and the nut being further provided, in its outer face, with a groove communicating with the outer end of the bore, a locking stud arranged in the enlarged portion of the bore and having a stem extending through the smaller portion of the bore and projecting into the groove, a coiled spring on the stem of the stud and bearing between the inner side thereof and the inner end of the enlarged portion of the bore, said spring serving to project the outer end of the stud, and a key arranged in the groove and extending through an opening in the projecting portion of the stem, in combination with a washer for arrangement between the nut and the work and having grooves for engagement by the stud to lock the nut and also having radial grooves on the other side each presenting a biting edge.

In testimony whereof I affix my signature in presence of two witnesses.

JOHN R. FORMBY.

Witnesses:
 AUG. JONES,
 N. H. LAWRENCE.

Copies of this patent may be obtained for five cents each, by addressing the "Commissioner of Patents, Washington, D. C."